Feb. 5, 1935.  C. L. EKSERGIAN  1,989,743

METHOD OF MAKING WHEELS

Filed May 27, 1932

INVENTOR
Carolus L. Eksergian,
BY
John P. Tarbox
ATTORNEY

Patented Feb. 5, 1935

1,989,743

UNITED STATES PATENT OFFICE 1,989,743

METHOD OF MAKING WHEELS

Carolus L. Eksergian, Detroit, Mich., assignor to Budd Wheel Company, Philadelphia, Pa., a corporation of Pennsylvania Application May 27, 1932, Serial No. 613,825

1 Claim. (Cl. 29—159.02)

My invention relates to wheels and to the method of making or assembling them, and particularly to wheels of the tension spoke type and to the method of placing the spokes relative to the rim and the hub. The invention is also applicable to wheels of other types embodying the tension, or tension spoke, principle.

An object of my invention is to simplify the assembly of tension wheels by flexing one or both of the rim and hub members, preferably only the rim, through the intermediary of the spokes, thereby only locally temporarily distorting the flexed member, reducing the total amount of force required, more firmly seating the spokes in the flexed member and obtaining other advantages.

It has heretofore been suggested to flex the rim of a tension spoke wheel radially inwardly, while securing the inner ends of the spokes to the hub. It has also, been suggested to flex the rim axially for the same purpose, but in either case, a substantial portion, or area, of the rim about the end of each spoke is required to be flexed, since it is this portion or area which is first, or simultaneously, flexed with the inward movement of the spoke.

Also, since the pressure was exerted simultaneously on the rim and the outer spoke ends there was no tendency to seat these ends especially securely, until after the inner ends had been secured and the pressure released.

In practicing my invention, I have found, by flexing the rim, through the intermediary of the spokes or in other words, applying pressure directly and locally to the outer ends of the spokes, without, at the same time applying it to the rim, except through the intermediary of the spokes, that sufficient flexure of the rim for effecting the purpose of such flexures, is obtained with substantially reduced pressure.

By my method also, the ends of the spokes are more effectively seated in the rim, since these ends are first pressed relative to the rim and the latter subsequently pressed by the spokes to obtain the required flexure.

Figure 1:
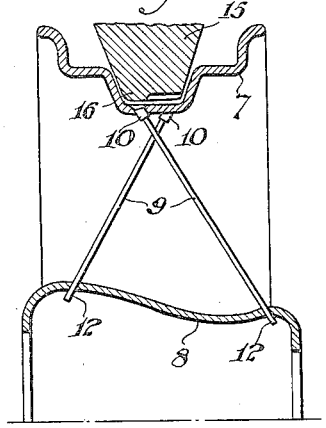
Figure 2:
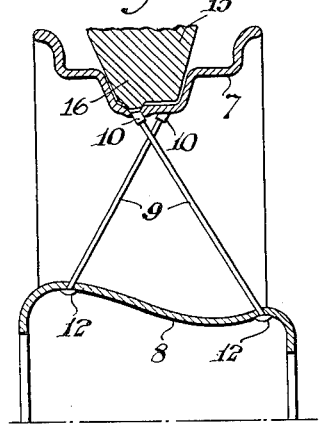
Figure 3:
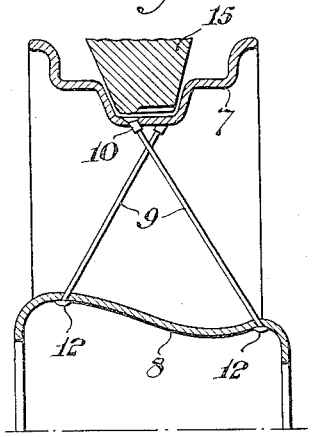
Figure 4:
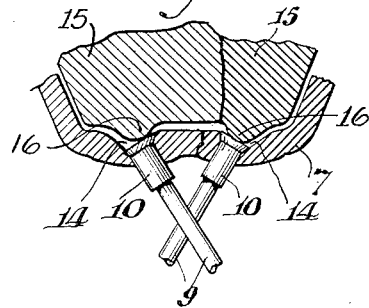

Figures 1, 2 and 3, of the accompanying drawing, are views, in axial section, of the elements of a wheel adapted to my invention, showing successive steps of the method thereof, and Fig. 4 is an enlarged view of a portion of the device, in the assembling state of Fig. 2, but showing perimetrically spaced axial sections in side-by-side relation, to illustrate a single member for simultaneously pressing a plurality of spokes to temporarily distort local portions of the rim, as above mentioned and as hereinafter more particularly pointed out.

Referring to the drawing, a wheel of one type for which my invention is adapted, comprises a rim member 7 and a hub member 8 interconnected by a plurality of wire spokes 9 which are of the riveted type having heads 10, seated in suitable sockets in the rim, and inner ends 12 secured within the hub shell, as will hereinafter appear.

In a preferred embodiment of the invention, although not so limited, the hub and rim are of pressed sheet-metal of hollow transverse, or axial, perimetrical section, of substantially channel-shape, the rim being of the drop-center type. As shown more clearly in Fig. 4, seats 14, in the center of the rim, are provided with apertures, about which, cylindrical and frustro conical surface portions of the rim, conforming to corresponding portions of the spokes, are disposed.

In practicing the method of my invention, the hub and the rim are concentrically mounted and centered symmetrically with respect to a median plane, by means of suitable jigs or other mechanism, not germane to the invention, and the spokes inserted, in two series or sets about the rim and hub, diagonally through the rim seats, in oppositely sloping direction from the wheel-load plane. This operation places the inner ends 12 of the spokes loosely through openings in the hub and loosely positions the spoke heads 10 in the rim seats 14.

The wheel parts are then in the position, indicated in Fig. 1, for the reception, against the spoke heads 10, of a die or dies 15 having a projection or projections 16 on the radially inner surface thereof that are adapted, in moving radially inward toward the rim, to first engage the end or ends of the spokes. That is, the initial contact of the die is directly and locally against the spoke head and not against any part of the rim.

With continued inward movement of the die, the spoke head is first firmly depressed into its rim seat, after which operation, portions of the rim local to, and about, the spoke head are depressed or carried radially inward. This action moves the spokes radially inward to the final operative positions they are to occupy in the completed wheel, in which positions, the inner ends 12 are rigidly and permanently fixed to the hub, as by upsetting them, as shown in Fig. 2, by edge-welding to a suitable rim part, or by other means.

When the die pressure is released, the rim portions which have been temporarily distorted within the elastic limit of the material thereof, tend to spring back to the normal configuration of the rim to tension the spokes 9 between the hub and the rim. The relative positions of the wheel parts and die, after this step are indicated in Fig. 3.

It is contemplated to exert force against the spokes separately, by a single tool or die having only one projection 16, by a plurality of separate dies or by a segmental die having any desired number of segments and spoke-pressing projections.

In Fig. 4, the die has a plurality of projections 16 for simultaneously engaging the heads of spokes in each set. It may have a plurality of the projections for engaging the spoke heads of one set; two such dies may simultaneously, or successively, engage the heads of the respective sets, or any number and combination of dies suited to the number of spokes or spoke sets, and to the purpose of the invention, may be employed.

Although I have shown and described particular forms of my invention, changes may be effected therein without departing from the spirit and scope thereof, as set forth in the appended claim.

What I claim is:

The method of assembling a wire type wheel having hub and rim members connected by a plurality of series of spokes provided with heads on one end, consisting of assembling the parts including the entire plurality of spokes and threading all of the spokes of all of the series through the hub and rim members with their headed ends coacting collectively with but one of said members, holding said hub and rim members concentrically with respect to each other against any movement except radial distortion, simultaneously exerting pressure on all of the heads of all of the series of spokes to radially flex that member engaged by the heads toward the other while maintaining the relative original position of the members in a median plane, heading the free ends of the spokes as threaded through the unflexed member into intimate contact with said member and thereby securing the spokes thereto while maintaining the radial flexure of the other member, and thereafter releasing the pressure of flexure from the heads of the spokes whereby the tendency of the flexed member to return to its unflexed condition applies proper wheel tension to the spokes.

CAROLUS L. EKSERGIAN.